May 9, 1933. J. P. THOMPSON 1,908,080
SCREW
Filed May 20, 1932
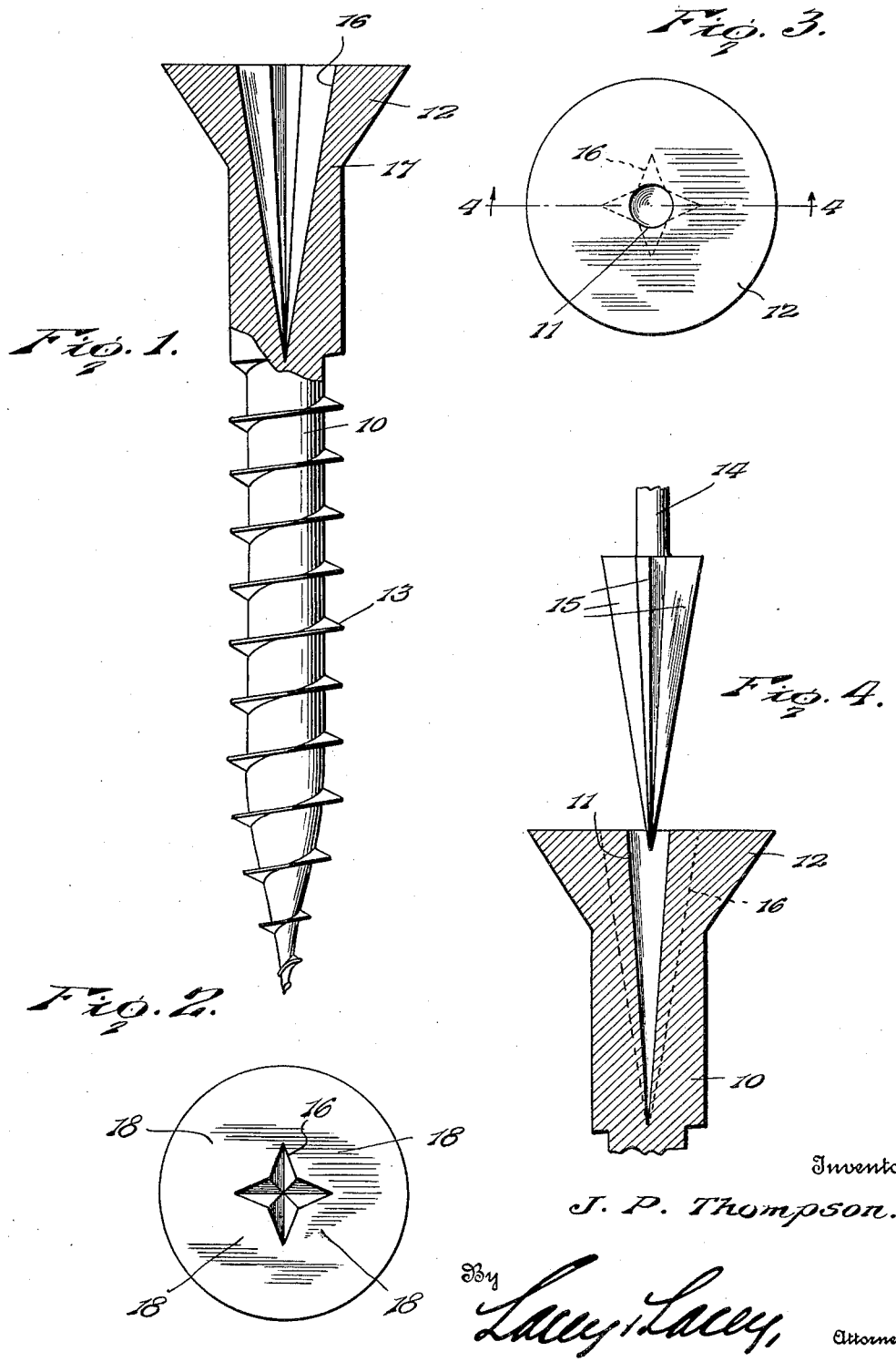
Inventor
J. P. Thompson.
By Lacey & Lacey, Attorneys Patented May 9, 1933

1,908,080

UNITED STATES PATENT OFFICE

JOHN P. THOMPSON, OF PORTLAND, OREGON, ASSIGNOR, BY DIRECT AND MESNE ASSIGNMENTS, TO H. F. PHILLIPS, OF PORTLAND, OREGON

SCREW

Application filed May 20, 1932. Serial No. 612,555.

This invention relates to screws and has for an object to provide a screw having a novel screw driving tool receiving aperture which permits a single screw driving tool to drive screws of various sizes.

A further object is to provide a screw provided with a punched aperture having side walls which converge downwardly to a point on the axis of the screw and converge radially outward to a knife edge which latter makes available the use of automatic machinery to produce screws in quantities at reasonable cost.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

Hitherto the manufacture of screws with a cruciform or other shape of aperture has been impractical, several proposed types requiring casting, which is so expensive as to make manufacturing costs prohibitive. Other types require broaching. This operation pushes the metal ahead of the tool and so disturbs the distribution of metal as to render the screw head extremely fragile. Ordinary screws are cut, rolled or stamped by automatic machinery and cost but a few cents per hundred to make. It is, therefore, one of the aims of the present invention to permit the use of automatic machinery by so altering the hitherto proposed cruciform or other shaped aperture as to retain their desirable virtues, while permitting of the usual automatic machinery to be used with but slight alterations as to increase the cost of manufacture only to an inappreciable extent. This is accomplished in the main by the novel radially outward converging walls of the apertures permitting of the use of a star die or similar cutting tool, the wings of which taper from top to bottom and also taper from the axis of the die radially outward to knife edges. This novel radially outward taper of the groove also results in certain additional stronger near the outer edge than hitherto possible, a smaller opening need be made in the screw, and the product has a neater appearance.

In the accompanying drawing forming part of this specification,

Figure 1 is a side elevation, partly in section, of a screw constructed in accordance with the invention.

Figure 2 is a plan view of the screw.

Figure 3 is a plan view of the screw showing an initial axial tapered opening formed therein, and, Figure 4 is a detail section showing the use of a star die to enter the tapered opening to produce the novel aperture.

Referring now to the drawing in which like characters of reference designate similar parts in the various views, 10 designates a wood screw, although it is to be understood that the invention is applicable to machine screws, bolts, and other similar connectors. In practicing the invention an axial tapered opening 11 may be drilled, punched, or otherwise formed in the head 12 of the screw, as shown in Figures 3 and 4. The opening tapers from its outer end downwardly to a point on the axis of the screw, and is preferably of such depth as to extend into the shank of the groove to the thread thereof, as shown in Figure 1. However, the opening may be of less depth, if desired, although in practice, about one-third the length of the screw, more or less, will be found to be practical.

Subsequently the tapered opening 11 is enlarged at the outer end by means of a winged or star die 14, for instance, as best shown in Figure 4. Preferably the die has four radial wings 15, each of which is tapered downwardly from the top of the wing to the bottom thereof, that is, is wedge shaped longitudinally. Each wing is, in addition, tapered radially outward from the axis of the die, that is, is wedge shaped transversely to provide cutting edges all of which converge downwardly at like angles to a common penetrating point on the axis of the die. Insertion of this die into the outer end of the tapered opening 11 forms a winged incision or screw-driving tool receiving aperture 16 in the screw having the exact shape of the die, as shown in Figures 1 and 2.

If desired the initial formation of the tapered opening 11 may be dispensed with and the winged aperture 16 may be formed by use of the die alone.

Each wing of the aperture 16 in the screw exhibits tapers in both directions, that is, longitudinally from top to bottom and transversely or radially outward to a knife edge. More specifically the side walls of each wing converge downwardly in the direction of their length to a point on the axis of the screw and converge radially in the direction of their width to a knife edge. In the preferred embodiment the knife edges of all the wings converge at like angles to a common point on the axis of the screw. The cutting of this novel incision or aperture, as above described, does not weaken the screw to any appreciable extent since, as will be seen by referring to Figure 1, an adequate wall 17 of metal remains beyond the aperture to the edge of the head, while by referring to Figure 2, it will be seen that large sector-shaped areas 18 exist between the branches or wings of the aperture and the outer edge of the head. As a result the metal is displaced but slightly in counter distinction to the great mass of metal distorted by broaching apertures having square outer ends as has hitherto been proposed.

The winged aperture 16, above described may be produced by the usual automatic machinery slightly altered to initially form the tapered opening 11 and subsequently enlarge the outer end of the opening. Alteration may simply be made to form the aperture by a single thrust of a cutter such as a winged die. This piercing operation can be accomplished with great rapidity in practice.

An advantage of the novel aperture will be apparent in that a single screw driving tool, having the general shape of the die 14, may be used to drive screws of various sizes since all apertures will have substantially identical taper from the top of the screw head to the bottom point on the axis of the screw. Large screws will simply have deep tapered incisions or apertures while small screws will have apertures of less depth. Also the same die will fit nearly all sizes of screws, in some sizes it will go in for quite a distance, while in other sizes it will advance but a short distance. The same is true of the screw driving tool.

From the above description it is thought that the construction and operation of the invention will be fully understood without further explanation.

What is claimed is:

1. A screw provided with a screw driving tool receiving winged aperture, the side walls of each wing converging radially in the direction of their width to an edge and converging downwardly in the direction of their length to a point on the axis of the screw.

2. A screw provided with a screw driving tool receiving aperture having wings, the side walls of which converge radially outward to knife edges which converge downwardly at like angles to a common point on the axis of the screw.

3. A screw having a shank terminating in a head, there being a screw driving tool receiving winged aperture extending through the head into said shank, the side walls of each wing converging radially in the direction of their width to knife edges and converging downwardly in the direction of their length to a common point on the axis of the screw.

4. A screw having a punched screw driving tool receiving winged aperture having side faces converging in the direction of their width radially to knife edges and converging in the direction of their length to a point on the axis of the screw.

In testimony whereof I affix my signature.

JOHN P. THOMPSON.